March 10, 1964 H. E. CRINER 3,124,660

READ HEAD FOR MAGNETIC SURFACE RECORDING

Filed March 7, 1960 2 Sheets-Sheet 1

INVENTOR
HARRY E. CRINER
BY HIS ATTORNEYS
HARRIS, KIECH, RUSSELL & KERN

March 10, 1964 H. E. CRINER 3,124,660
READ HEAD FOR MAGNETIC SURFACE RECORDING
Filed March 7, 1960 2 Sheets-Sheet 2

INVENTOR
HARRY E. CRINER
BY HIS ATTORNEYS
HARRIS, KIECH, RUSSELL & KERN

United States Patent Office 3,124,660
Patented Mar. 10, 1964

3,124,660

READ HEAD FOR MAGNETIC SURFACE RECORDING

Harry E. Criner, Sierra Madre, Calif., assignor to Ford Motor Company, Dearborn, Mich., a corporation of Delaware Filed Mar. 7, 1960, Ser. No. 13,048
8 Claims. (Cl. 179—100.2)

This invention relates to apparatus for maintaining magnetic writing and reading equipment at controlled positions adjacent magnetic recording surfaces. Apparatus of this type is generally referred to as a read head or as a read and write head.

Magnetic surface recording requires the read head to be accurately and closely positioned at the recording surface. Some present day recording equipment requires a head clearance of less than 1/1000 of an inch for optimum performance and, accordingly, it is an object of the present invention to provide a read head that can be automatically and accurately positioned relative to a record surface with a controlled clearance of 1/1000 of an inch or less. A further object is to provide such a read head that may be used in conjunction with a record surface that is moving past the read head at a relatively high velocity and, in particular, at velocities in the order of 150 feet per second and higher.

It is an object of the invention to provide a read head wherein the magnetic unit is carried on a piston or the like that is extended toward and withdrawn from the record surface by means of controlled gas pressure. A further object is to provide such a structure wherein the piston is extended by gas pressure with the magnitude of movement of the piston controlled by reaction forces generated by gas flow between the record surface and the piston. Another object is to provide such a structure wherein the reaction or opposing force is produced by exhausting gas at the face of the piston from the back of the piston. Another object is to provide another form of the read head wherein the reaction or opposing force is generated by gas drawn into the converging zone between the piston face and record surface by the movement of the record surface.

It is an object of the invention to provide a read head that is maintained in the retracted position by a spring with the spring force being very small relative to the gas pressure forces and, hence, substantially ineffective in the positioning of the read head when extended. A further object is to provide a read head wherein the clearance between the head and the record surface is independent of the gas supply pressure. A further object is to provide such a structure wherein solid contact between the head and the record surface may be eliminated.

It is an object of the present invention to provide a read head that is controlled by gas under pressure with the gas consumption being very low so that a large number of read heads can be actuated from a single source. A further object is to provide a magnetic recording system wherein the moving record surface and the gas blower for the read head are driven in synchronism so as to maintain the gas reaction force at the record surface substantially independent of surface velocity and gas pressure. Another object is to provide such a system which may utilize a constant volume blower or a centrifugal constant pressure blower.

It is an object of the invention to provide a read head for a magnetic recording system having a frame, a piston mounted in the frame for movement toward and away from the record surface, a magnetic pickup unit mounted in the piston face, spring means for coupling the piston and frame with the frame having a gas chamber communicating with the piston back, means for establishing a substantially constant gas pressure within the chamber to produce a force urging the piston out of the frame toward the record surface against the action of the spring means, and means for generating a gas force on the piston face opposing the force on the piston back.

The invention also comprises novel details of construction and novel combinations and arrangements of parts, which will more fully appear in the course of the following description.

The drawings merely show and the description merely describes preferred embodiments of the present invention which are given by way of illustration or example.

Figures 1, 2, 3, 4, 5:
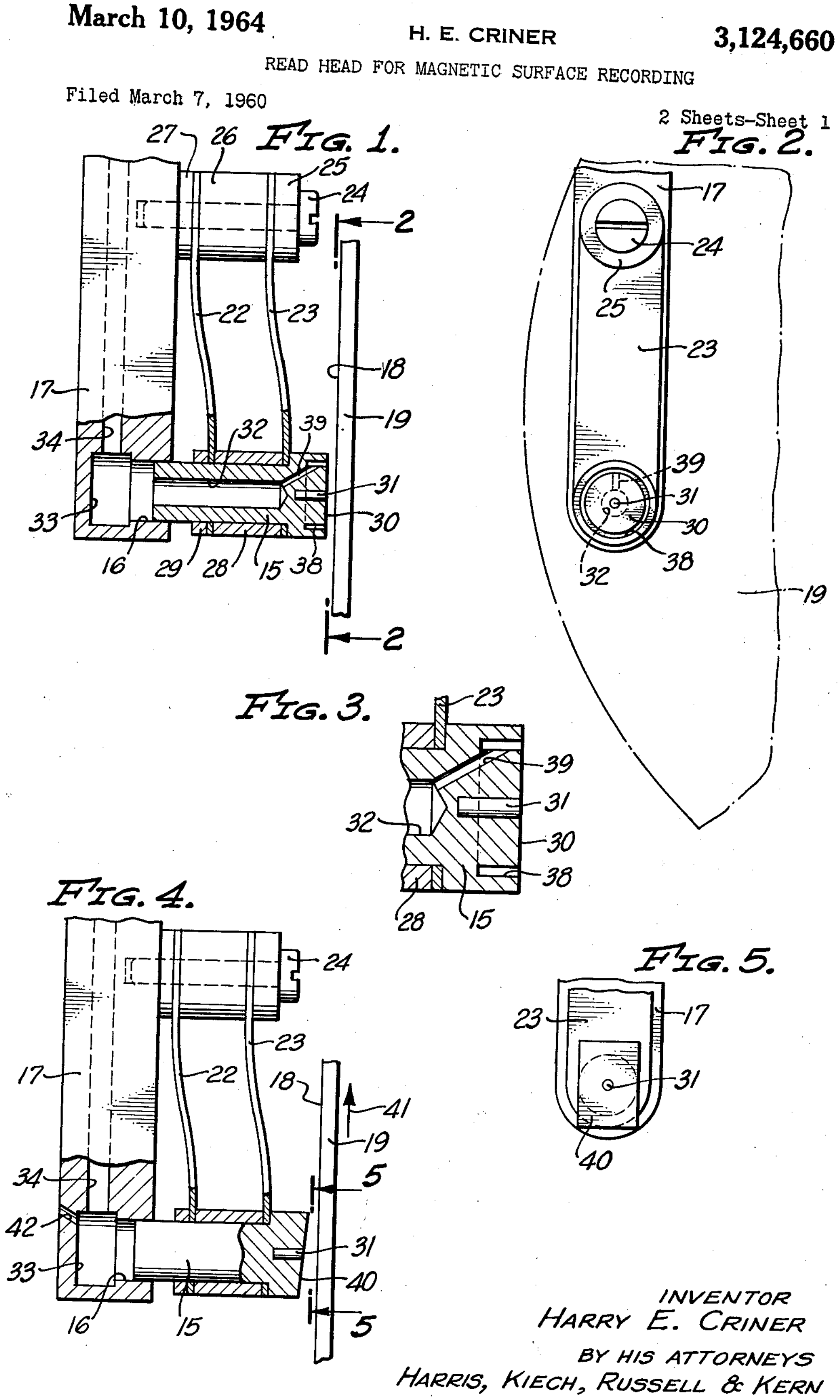
FIG. 1 is a side view, shown partly in section, of a preferred form of the invention.
FIG. 2 is a sectional view taken along the line 2—2 of FIG. 1.
FIG. 3 is an enlarged view of a portion of the apparatus of FIG. 1.
FIG. 4 is a view similar to that of FIG. 2 of an alternative form of the invention.
FIG. 5 is a sectional view taken along the line 5—5 of FIG. 4.

In the embodiment of FIGS. 1, 2 and 3, a piston 15 is mounted in an opening 16 of a frame or arm 17 for sliding movement toward and away from a record surface 18. The record surface 18 is shown herein as being on a disc 19 but, of course, could also be on a plate, belt, tape or drum.

The piston 15 is shown extended in FIG. 1 and spring means is provided for coupling the piston and frame and normally moving the piston to its retracted position remote from the record surface. In the embodiment shown herein, leaf springs 22, 23 are disposed parallel to the record surface with one end of the springs clamped to the frame 17 by a bolt 24 and spacers 25, 26, 27. The other end of each spring is positioned about the piston 15 and is held in place by a spacer 28 and lock ring 29. This type of spring structure permits movement of the piston toward and away from the record surface with very little constraint while exerting relatively large constraints to all other linear and angular motions of the piston. The total travel of the piston will ordinarily be about 0.05 inch with the clearance between piston face 30 and the record surface 18 being less than 1/1000 of an inch and controlled to an accuracy of $\pm 10$ percent of the nominal gap. A magnetic pickup unit 31 of conventional design is mounted in the piston flush with the face 30. Electrical leads for the pickup unit may be directed through a passage 32 in the piston, the opening 16, and a chamber 33 and passage 34 in the frame.

An annular groove 38 is provided in the face 30 of the piston, the groove being connected to the passage 32 by an orifice 39 (FIG. 3). The orifice 39 permits gas flow from the chamber 33 to the face of the piston and the groove 38 provides for substantially uniform distribution of this gas flow over the piston face.

With no gas pressure connected to the passage 34 of the frame, the springs 22, 23 will move the piston to the retracted position relatively remote from the record surface. When gas under pressure is applied to the passage 34, the pressure acting on the back of the piston will generate a force urging the piston outward against the action of the springs. The gas pressure in the frame will also produce gas flow through the orifice 39 to the piston face and as the space between the piston face and record surface becomes small, the gas flow resistance through this space becomes large and a force is generated on the piston face opposing the force on the piston back. When the piston has moved toward the record surface to the position where the sum of the force on the piston face and the force exerted by the springs is equal to the force exerted on the piston back, the piston will remain stationary and the piston face will be spaced from the record surface at a controlled position.

It should be noted that as the spacing between the piston face and record surface approaches zero, the gas pressure at the piston face approaches the gas pressure at the piston back. The area of the piston face can be made larger than the area of the piston back so that the force at the face can exceed the force at the back. This preferred type of construction permits the spring force to be made insignificant relative to the gas forces at the face and back. Then the clearance or space between the piston face and record surface is a function only of the relative areas of the face and back and is substantially independent of the gas supply pressure. Also, the clearance will be independent of the gas viscosity and of the velocity of the recording surface. This preferred form of the read head also prevents the piston from contacting the record surface, a particularly significant point when high velocity surfaces are involved.

In some applications of the read head of FIGS. 1–3, particularly where a large number of read heads are used, the amount of power required to provide the gas under pressure to each read head is significant and may be disadvantageous. An alternative form of the invention is shown in FIGS. 4 and 5 wherein the power requirements are significantly reduced. Elements corresponding to those of the earlier described embodiment are identified by the same reference numerals.

In the embodiment of FIGS. 4 and 5, the piston 15 has a face 40 that is preferably square or rectangular, with the plane of the face converging with the record surface 18 in the direction of motion of the record as indicated by the arrow 41. The relative motion of the piston face and the record surface and the viscosity of the gas therebetween generates a pressure increase and, hence, a gas force on the face of the piston which opposes the force produced by the gas in the chamber 33 of the frame. With the opposing forces balanced, the clearance between the piston face and record surface is maintained substantially constant. A pressure source is connected to the passage 34 to provide the force which moves the piston outward toward the record surface. This pressure source may be a constant volume blower operated in conjunction with a small orifice 42 or may be a constant pressure blower such as a centrifugal blower, to provide a force on the piston to urge the piston face toward the record surface. The power requirement at the pressure source for this arrangement is considerably less than for the previously described embodiment as there is no gas discharge across the face of the piston. It should be noted that a single orifice such as the orifice 42 will suffice for operating a large number of read heads from a single constant volume blower.

Figure 9:
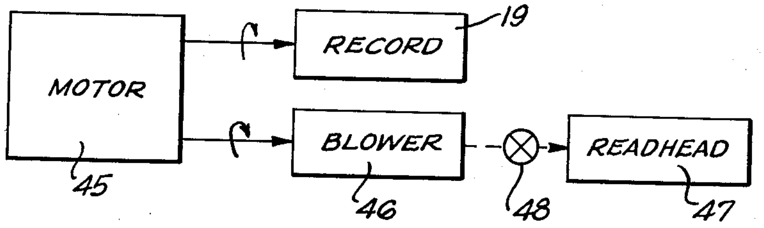
FIG. 9 is a block diagram illustrating the operation of the invention.

For a particular gas pressure at the source and a particular velocity for the record surface, the clearance between the piston face and the record surface will be a function of the relative areas of the piston face and back and the force exerted by the springs, as in the embodiment of FIGS. 1–3. Solid contact between head and recording surface, with subsequent rubbing and damage, may be eliminated by operating the apparatus in the manner shown in FIG. 9. A single power source such as an electric motor 45 drives the record 19 and also drives a blower 46. The blower output is connected to the frame of the read head 47. An off-on control valve 48 may be inserted between the blower and read head if desired. With this arrangement, the gas pressure and, hence, the force urging the piston out is proportional to the square of the velocity of the record surface. The components are so dimensioned that the viscously generated pressure force on the face 40 opposes and exceeds this force at less than the design clearance, but before the clearance becomes zero. As in the earlier embodiment, the force exerted by the springs is made relatively low. This apparatus maintains constant head clearance at constant record velocities and prevents contact of the head with the record surface at lower record velocities.

Figure 6:
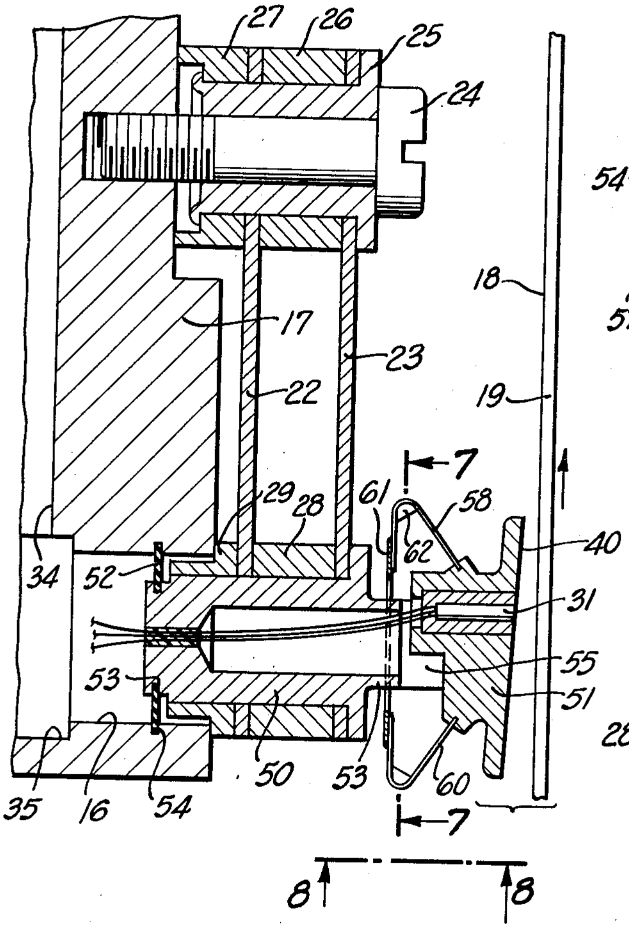
FIG. 6 is a sectional view of another form of the invention showing a different type of suspension.
Figure 7:
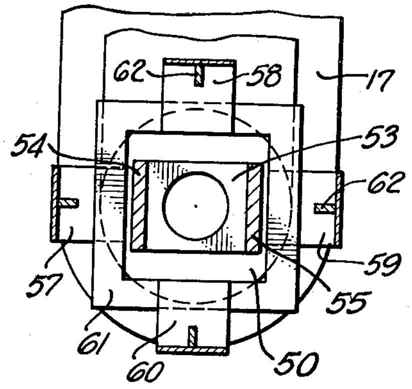
FIG. 7 is a sectional view taken along the line 7—7 of FIG. 6.
Figure 8:
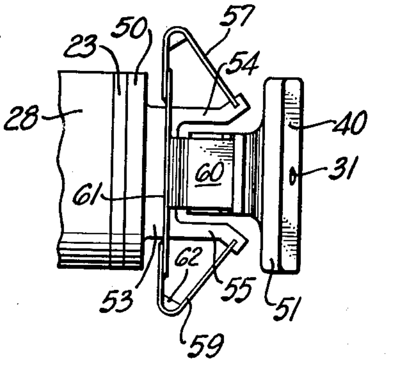
FIG. 8 is an end view taken along the line 8—8 of FIG. 6.

Another form of the invention featuring a self-aligning suspension for the pickup unit 31 and piston face 40 is shown in FIGS. 6, 7 and 8. Elements common to the various embodiments are identified by the same reference numerals. The piston is formed of a body 50 and a head 51 joined by a spring suspension. The piston body 50 may be mounted on the leaf springs 22, 23 in the same manner as in the preceding embodiment. A flexible diaphragm 52 of rubber or other suitable material may be fixed in a groove 53 adjacent the back of the piston body 50 and in a groove 54 in the frame to provide a seal for the opening 16 to eliminate gas pressure loss in the installation.

The projecting end of the piston body 50 terminates in a boss 53 having parallel arms 54, 55. Four flat spring elements 57, 58, 59, 60 are carried on an apertured plate 61 in a cruciform shape, as seen in FIG. 7. Each of the spring elements 57–60 is formed into a V-shape with a stiffener fillet 62 fixed at the apex to prevent flexing of the spring element at the bend. The free ends of opposing spring elements 58, 60 are fixed to the piston head 51 and the free ends of opposing spring elements 57, 59 are fixed to the arms 54, 55, respectively, of the piston body. The spring elements and the piston head are designed so that the planes of the spring elements intersect at the centroid of the face 40. This construction provides self-alignment of the face in the desired relation with the record surface. The self-aligning unit does not require as close dimensional tolerances as other units and is easier to manufacture and fabricate.

The read head of FIGS. 6–8 operates in the same manner as that of FIGS. 4 and 5. It should be noted that while a parallel leaf spring structure has been shown for coupling the piston to the frame, other types of spring means con be utilized to provide the withdrawal force when the air pressure is shut off.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a read head for a magnetic recording system including a moving record surface, the combination of: a frame; a piston mounted in said frame for movement toward and away from said record surface, said piston having a back disposed within said frame and a face disposed adjacent said record surface, with the distance between said face and record surface decreasing in the direction of motion of said surface; a magnetic pickup unit mounted in said piston face; and spring means for coupling said piston and frame, said frame having a gas flow passage for directing a source of gas at substantially constant pressure to said piston back urging said piston out of said frame toward said record surface against the action of said spring means, whereby the gas force on said piston back is balanced by the sum of the force exerted by said spring means and the force due to relative motion of said piston face and record surface.

2. In a read head for a magnetic recording system including a record surface moving in a plane, the combination of: a frame; a piston mounted in said frame for movement toward and away from said record surface, said piston having a back disposed within said frame and a smooth face of substantially rectangular cross section disposed adjacent said record surface, with two parallel edges of said face parallel to the plane of said record surface and with the plane of said face converging toward the plane of said record surface in the direction of motion of said record surface; a magnetic pickup unit mounted in said piston face; and spring means for coupling said piston and frame, said frame having a gas flow passage for directing a source of gas at substantially constant pressure to said piston back urging said piston out of said frame toward said record surface against the action of said spring means, whereby the gas force on said piston back is balanced by the sum of the force exerted by said spring means and the force due to relative motion of said piston face and record surface.

3. In a read head for a magnetic recording system including a moving record surface, the combination of: a frame; a piston mounted in said frame for movement toward and away from said record surface, said piston including a body unit having a back disposed within said frame, a head unit having a face of substantially rectangular cross section disposed adjacent said record surface, and a flexible suspension connecting said head unit to said body unit, with the plane of said face converging toward the plane of said record surface in the direction of motion of said record surface; a magnetic pickup unit mounted in said head unit; and spring means for coupling said body unit and frame, said frame having a gas flow passage for directing a source of gas at substantially constant pressure to said piston back urging said piston out of said frame toward said record surface against the action of said spring means, whereby the gas force on said piston back is balanced by the sum of the force exerted by said spring means and the force due to relative motion of said piston face and record surface.

4. In a read head for a magneic recording system, the combination of: a moving record surface; a frame; a piston mounted in said frame for movement toward and away from said record surface, said piston having a back disposed within said frame and a face of substantially rectangular cross section disposed adjacent said record surface, with the plane of said face converging toward the plane of said record surface in the direction of motion of said record surface; a magnetic pickup unit mounted in said piston face; a gas blower; a drive unit coupled to said record surface and said blower for driving said surface and blower in synchronism; and spring means for coupling said piston and frame, said frame having a gas flow passage coupled to said blower for directing gas at substantially constant pressure to said piston back urging said piston out of said frame toward said record surface against the action of said spring means, whereby the gas force on said piston back is balanced at normal record surface velocity by the sum of the force exerted by said spring means and the force due to relative motion of said piston face and record surface and said piston face is moved away from said record surface when the surface velocity decreases.

5. In a read head for a magnetic recording system, the combination of: a moving record surface; a frame; a piston mounted in said frame for movement toward and away from said record surface, said piston having a back disposed within said frame and a face of substantially rectangular cross section disposed adjacent said record surface, with the plane of said face converging toward the plane of said record surface in the direction of motion of said record surface; a magnetic pickup unit mounted in said piston face; a substantially constant volume gas blower; a drive unit coupled to said record surface and said blower for driving said surface and blower in synchronism; and spring means for coupling said piston and frame, said frame having a gas flow passage coupled to said blower for directing gas to said piston back urging said piston out of said frame toward said record surface against the action of said spring means, said gas flow passage including an orifice providing a gas vent to the atmosphere.

6. In a read head for a magnetic recording system, the combination of: a moving record surface; a frame; a piston mounted in said frame for movement toward and away from said record surface, said piston having a back disposed within said frame and a face of substantially rectangular cross section disposed adjacent said record surface, with the plane of said face converging toward the plane of said record surface in the direction of motion of said record surface; a magnetic pickup unit mounted in said piston face; a substantially constant pressure gas blower; a drive unit coupled to said record surface and said blower for driving said surface and blower in synchronism; and spring means for coupling said piston and frame, said frame having a gas flow passage coupled to said blower for directing gas to said piston back urging said piston out of said frame toward said record surface against the action of said spring means, whereby the gas force on said piston back is balanced at normal record surface velocity by the sum of the force exerted by said spring means and the force due to relative motion of said piston face and record surface and said piston face is moved away from said record surface when the surface velocity decreases.

7. In a read head for a magnetic recording system including a moving record surface, the combination of: a frame; a piston mounted in said frame for movement toward and away from said record surface, said piston having a back disposed within said frame and a face disposed adjacent said record surface, with the distance between said face and record surface decreasing in the direction of motion of said surface; a magnetic pickup unit mounted in said piston face; spring means for coupling said piston and frame, said frame having a gas flow passage for directing gas to said piston back urging said piston out of said frame toward said record surface against the action of said spring means, said gas flow passage including an orifice providing a gas vent to the atmosphere; and a source of gas at a substantially constant rate of volume flow connected to said gas flow passage, whereby the gas force on said piston back is balanced by the sum of the force exerted by said spring means and the force due to relative motion of said piston face and record surface.

8. In a read head for a magnetic recording system including a moving record surface, the combination of: a frame; a piston mounted in said frame for movement toward and away from said record surface, said piston including a body unit having a back disposed within said frame, a head unit having a face of substantially rectangular cross section disposed adjacent said record surface, and a flexible universal suspension connecting said head unit to said body unit permitting pivoting of said head unit relative to said body unit and record surface about two intersecting axes, with the plane of said face converging toward the plane of said record surface in the direction of motion of said record surface; a magnetic pickup unit mounted in said head unit; and spring means for coupling said body unit and frame, said frame having a gas flow passage for directing a source of gas at substantially constant pressure to said piston back urging said piston out of said frame toward said record surface against the action of said spring means.

References Cited in the file of this patent

UNITED STATES PATENTS

| | | |
|---|---|---|
| 2,862,781 | Baumeister | Dec. 2, 1958 |
| 2,886,651 | Vogel | May 12, 1959 |
| 2,928,709 | Baumeister | Mar. 15, 1960 |

FOREIGN PATENTS

| | | |
|---|---|---|
| 764,433 | Great Britain | Dec. 28, 1956 |
| 1,020,803 | Germany | Dec. 12, 1957 |